(12) United States Patent
Dimou et al.

(10) Patent No.: US 11,659,467 B2
(45) Date of Patent: May 23, 2023

(54) METHODS AND APPARATUSES FOR OUT OF COVERAGE DETERMINATION(S)

(71) Applicant: QUALCOMM Incorporated, San Diego, CA (US)

(72) Inventors: Konstantinos Dimou, San Francisco, CA (US); Yan Zhou, San Diego, CA (US); Tao Luo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/375,483

(22) Filed: Jul. 14, 2021

(65) Prior Publication Data

US 2022/0053402 A1     Feb. 17, 2022

Related U.S. Application Data

(60) Provisional application No. 63/066,746, filed on Aug. 17, 2020.

(51) Int. Cl.
*H04W 36/32*     (2009.01)
*H04W 36/00*     (2009.01)
(Continued)

(52) U.S. Cl.
CPC ........... *H04W 36/32* (2013.01); *H04W 16/28* (2013.01); *H04W 36/00837* (2018.08);
(Continued)

(58) Field of Classification Search
CPC ................. H04W 36/32; H04W 16/28; H04W 36/00837; H04W 36/305; H04W 72/0413;
(Continued)

(56) References Cited

U.S. PATENT DOCUMENTS

2013/0223235 A1* 8/2013 Hu ................. H04W 36/30
                                                          370/242
2015/0079991 A1* 3/2015 Koskinen ........ H04W 36/00837
                                                          455/436

(Continued)

FOREIGN PATENT DOCUMENTS

WO     2019032882 A1     2/2019

OTHER PUBLICATIONS

International Search Report and Written Opinion—PCT/US2021/041759—ISA/EPO—dated Nov. 3, 2021.

(Continued)

*Primary Examiner* — Ivan O Latorre
(74) *Attorney, Agent, or Firm* — Patterson+ Sheridan, L.L.P.; Kevin T. Cheatham

(57) ABSTRACT

Aspects of the present disclosure provide a method for wireless communications by a user equipment (UE). The method generally includes determining a failure to receive and decode at least one scheduled downlink (DL) transmission from a network entity is based, at least in part, on the UE being out of coverage and taking one or more actions, based, at least in part, on one or more conditions. The one or more actions include at least one of: performing an autonomous handover (HO) or transmitting a physical uplink control channel (PUCCH) with beam sweeping across multiple slots.

30 Claims, 13 Drawing Sheets

(51) Int. Cl.
   *H04W 16/28* (2009.01)
   *H04W 72/0446* (2023.01)
   *H04W 72/1273* (2023.01)
   *H04W 72/044* (2023.01)
   *H04W 36/30* (2009.01)
   *H04W 72/21* (2023.01)

(52) U.S. Cl.
   CPC ....... *H04W 36/305* (2018.08); *H04W 72/046* (2013.01); *H04W 72/0446* (2013.01); *H04W 72/1273* (2013.01); *H04W 72/21* (2023.01)

(58) Field of Classification Search
   CPC ........... H04W 72/0446; H04W 72/046; H04W 72/1273; H04W 36/36; H04B 7/0695; H04B 7/0408
   See application file for complete search history.

(56) References Cited

U.S. PATENT DOCUMENTS

| | | | |
|---|---|---|---|
| 2015/0141021 A1* | 5/2015 | Kapoulas | H04W 36/32 455/441 |
| 2015/0271861 A1 | 9/2015 | Li et al. | |
| 2020/0077319 A1* | 3/2020 | Lun | H04W 36/30 |
| 2020/0374960 A1* | 11/2020 | Deenoo | H04W 72/1284 |
| 2021/0058922 A1* | 2/2021 | Han | H04L 5/0055 |
| 2021/0351888 A1* | 11/2021 | Park | H04B 7/0456 |
| 2022/0201581 A1* | 6/2022 | Li | H04W 36/0058 |

OTHER PUBLICATIONS

Qualcomm Incorporated: "Long PUCCH Over Multiple Slots", 3GPP Draft, R1-1720684, 3GPP TSG RAN WG1 Meeting 91, Long PUCCH Over Multiple Slots, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051370145, pp. 1-3, Retrieved from the Internet: URL: http://www.3gpp.org/ftp/tsg%5Fran/WG1%5FRL1/TSGR1%5F91/Docs/ [retrieved on Nov. 18, 2017] p. 2.

Samsung, et al., "The Necessity of T312 in NR", 3GPP Draft, R2-1815359, 3GPP TSG-RAN WG2 #103bis, Discussion on Reuse of T312, 3rd Generation Partnership Project (3GPP), Mobile Competence Centre, 650, Route Des Lucioles, F-06921 Sophia-Antipolis Cedex, France, vol. RAN WG2. No. Chengdu. China, Oct. 8, 2018-Oct. 12, 2018, Sep. 28, 2018 (Sep. 28, 2018), 17 Pages, XP051524710, Retrieved from the Internet: URL:http://www.3gpp.org/ftp/tsg%5Fran/WG2%5FRL2/TSGR2%5F103bis/Docs/R2%2D1815359%2Ezip [retrieved on Sep. 28, 2018] p. 1 p. 3.

* cited by examiner

```
PUCCHFormatPDSCHErrorCauseDetectiion ::=
    format: {Format 0, Format 1, Format 2, Format 3, Format 4}
    NumberOfBeams {2, 3, 4, ..., 64}
    NumberOfSlotsPerBeam {1, 2, ..., 10}
    BeamOrder: Reported
}
...
}
```

OtherConfig information element

```
OtherConfig ::=          SEQUENCE {
  delayBudgetReportingConfig  CHOICE {
    release                     NULL,
    setup                       SEQUENCE {
      delayBudgetReportingProhibitTimer  ENUMERATED  {s0, s0dot4, s0dot8, s1dot6, s3, s6, s12, s30}
    }
  }

UeActionUponPdschErrorCauseOutOfCoverage  :  ENUMERATED  { Multi-slot PUCCH, UE Autonomous HO }
  UeActionUponPdschErrorCauseBeamBlocking   :  {UL Beam Sweeping, ...}          OPTIONAL,   -- Need M
  UeActionUponPdschErrorCausePartialBeamBlocking
  ActionUponMultiSlotPucchNack: { Multi-slot PUCCH, UE Autonomous HO }
  Multi-slotPUCCHConfiguration: Number of Slots Enumerated 2, , ...16
  UeAutonomousHoUponMultiSlotPucchConfiguration: PercentageA3TTTElapsed Enumerated 1, 2, ..., 99 %
}

OtherConfig-v1540 ::=    SEQUENCE {
  overheatingAssistanceConfig   SetupRelease   {OverheatingAssistanceConfig}   OPTIONAL,   -- Need M
  ...
}

OverheatingAssistanceConfig   ::=    SEQUENCE {
  overheatingIndicationProhibitTimer   ENUMERATED  {s0, s0dot5, s1, s2, s5, s10, s20, s30,
                                                    s60, s90, s120, s300, s600, spare3, spare2, spare1}
}
```

Instructions for UE method when multi-slot PUCCH Nack & Autonomous HO possible

FIG. 10

METHODS AND APPARATUSES FOR OUT OF COVERAGE DETERMINATION(S)

CROSS-REFERENCE TO RELATED APPLICATION(S)

This application claims benefit of and priority to U.S. Provisional Application No. 63/066,746 filed Aug. 17, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for taking one or more actions when a user equipment (UE) determines a failure to receive and decode at least one scheduled downlink (DL) transmission is based, at least in part, on the UE being out of coverage.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several innovative aspects, no single one of which is solely responsible for the desirable attributes.

Certain aspects of the subject matter described in this disclosure can be implemented in a method for wireless communication by a user equipment (UE). The method generally includes determining a failure to receive and decode at least one scheduled downlink (DL) transmission from a network entity is based, at least in part, on the UE being out of coverage; and taking one or more actions, based, at least in part, on one or more conditions, wherein the one or more actions include at least one of: performing an autonomous handover (HO); or transmitting a physical uplink control channel (PUCCH) with beam sweeping across multiple slots.

Certain aspects of the subject matter described in this disclosure can be implemented in a method for wireless communication by a network entity. The method generally includes configuring a UE to take one or more actions upon determining a failure to receive and decode at least one scheduled DL transmission from the network entity is based, at least in part, on the UE being out of coverage, wherein taking the one or more actions is based, at least in part, on one or more conditions and the one or more actions include at least one of: performing an autonomous HO; or transmitting a PUCCH with beam sweeping across multiple slots; and monitoring for UL transmissions from the UE in accordance with the configuration.

Certain aspects of the subject matter described in this disclosure can be implemented in an apparatus for wireless communications performed by a UE. The apparatus generally includes: at least one processor; and a memory coupled to the at least one processor, the memory including instructions executable by the at least one processor to cause the apparatus to: determine a failure to receive and decode at least one scheduled DL transmission from a network entity is based, at least in part, on the UE being out of coverage; and take one or more actions, based, at least in part, on one or more conditions, wherein the one or more actions include at least one of: performing an autonomous HO; or transmitting a PUCCH with beam sweeping across multiple slots Certain aspects of the subject matter described in this disclosure can be implemented in an apparatus for wireless communications performed by a network entity. The apparatus generally includes: at least one processor; and a memory coupled to the at least one processor, the memory including instructions executable by the at least one processor to cause the apparatus to: configure a UE to take one or more actions upon determining a failure to receive and decode at least one scheduled DL transmission from the network entity is based, at least in part, on the UE being out of coverage, wherein taking the one or more actions is based, at least in part, on one or more conditions and the one or more actions include at least one of: performing an autonomous HO; or transmitting a PUCCH with beam sweeping across multiple slots; and monitor for UL transmissions from the UE in accordance with the configuration Certain aspects of the subject matter described in this disclosure can be implemented in an apparatus for wireless communications performed by a UE. The apparatus generally includes: means for determining a failure to receive and decode at least one scheduled DL transmission from a network entity is based, at least in part, on the UE being out of coverage; and means for taking one or more actions, based, at least in part, on one or more conditions, wherein the one or more actions include at least one of: performing an autonomous HO; or transmitting a PUCCH with beam sweeping across multiple slots Certain aspects of the subject matter described in this disclosure can be implemented in an apparatus for wireless communications performed by a network entity. The apparatus generally includes: means for configuring a UE to take one or more actions upon determining a failure to receive and decode at least one scheduled DL transmission from the network entity is based, at least in part, on the UE being out of coverage, wherein taking the one or more actions is based, at least in part, on one or more conditions and the one or more actions include at least one of: performing an autonomous HO; or transmitting a PUCCH with beam sweeping across multiple slots; and means for monitoring for UL transmissions from the UE in accordance with the configuration Certain aspects of the subject matter described in this disclosure can be implemented in a computer-readable medium for wireless communications including instructions that, when executed by a processing system in a UE, cause the processing system to perform operations including: determining a failure to receive and decode at least one scheduled DL transmission from a network entity is based, at least in part, on the UE being out of coverage; and taking one or more actions, based, at least in part, on one or more conditions, wherein the one or more actions include at least one of: performing an autonomous HO; or transmitting a PUCCH with beam sweeping across multiple slots.

Certain aspects of the subject matter described in this disclosure can be implemented in a computer-readable medium for wireless communications including instructions that, when executed by a processing system in a network entity, cause the processing system to perform operations including: configuring a UE to take one or more actions upon determining a failure to receive and decode at least one scheduled DL transmission from the network entity is based, at least in part, on the UE being out of coverage, wherein taking the one or more actions is based, at least in part, on one or more conditions and the one or more actions include at least one of: performing an autonomous HO; or transmitting a PUCCH with beam sweeping across multiple slots; and monitoring for UL transmissions from the UE in accordance with the configuration To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and the description may admit to other equally effective aspects. Other features, aspects, and advantages will become apparent from the description, the drawings and the claims.

FIG. 10 illustrates an example configuration for out of coverage detection, in accordance with some aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
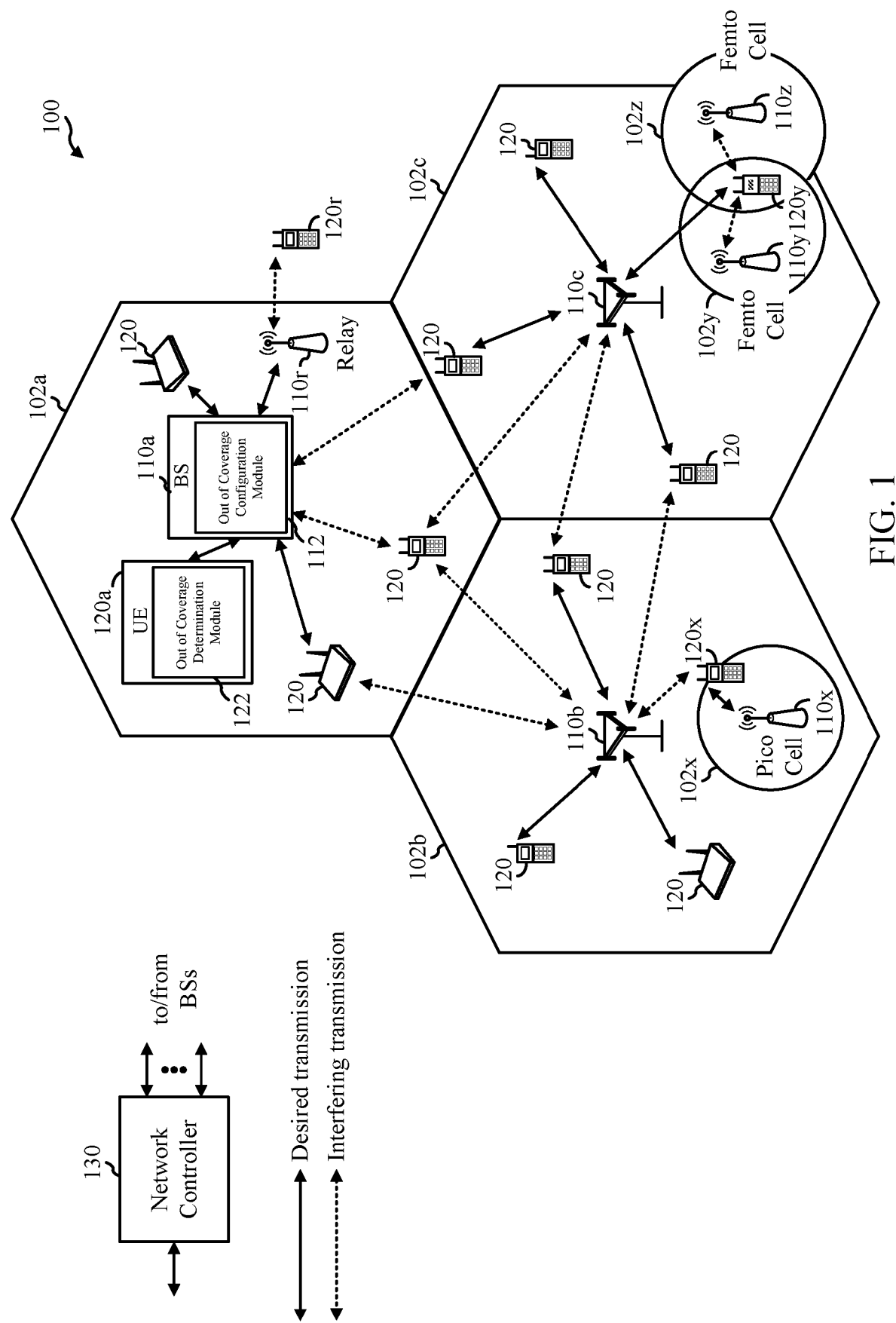
FIG. 1 shows an example wireless communication network in which some aspects of the present disclosure may be performed.

Aspects of the present disclosure relate to wireless communications, and more particularly, to techniques for taking one or more actions when a user equipment (UE) determines a failure to receive and decode at least one scheduled downlink (DL) transmission is based, at least in part, on the UE being out of coverage. In particular, one or more actions taken by the UE may include performing an autonomous handover or transmitting a physical uplink control channel (PUCCH) with beam sweeping across multiple slots, depending on one or more conditions. Aspects of the present disclosure may help to ensure that no DL transmissions (e.g., packets, blocks, etc.) are missed by the UE, thereby increasing communication reliability.

The following description provides examples and is not limiting of the scope, applicability, or examples set forth in the claims. Changes may be made in the function and arrangement of elements discussed herein. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

Example Wireless Communications System

FIG. 1 illustrates an example wireless communication network 100 in which aspects of the present disclosure may be performed. For example, as shown in FIG. 1, UE 120a may include an out of coverage determination module 122 that may be configured to perform (or cause UE 120a to perform) operations 500 of FIG. 5. Similarly, BS 110a may include an out of coverage configuration module 112 that may be configured to perform (or cause BS 110a to perform) operations 600 of FIG. 6.

As illustrated in FIG. 1, the wireless communication network 100 may include a number of base stations (BSs) 110a-z (each also individually referred to herein as BS 110 or collectively as BSs 110) and other network entities. A BS may be a station that communicates with UEs. Each BS 110 may provide communication coverage for a particular geographic area, sometimes referred to as a "cell". In 3GPP, the term "cell" can refer to a coverage area of a Node B (NB) and/or a Node B subsystem serving this coverage area, depending on the context in which the term is used. In NR systems, the term "cell" and next generation NodeB (gNB), NR BS, 5G NB, access point (AP), or transmission reception point (TRP) may be interchangeable. In some examples, a cell may not necessarily be stationary, and the geographic area of the cell may move according to the location of a mobile BS. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the UL and DL and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE 120 and a serving BS 110, which is a BS 110 designated to serve the UE 120 on the DL and/or UL. A finely dashed line with double arrows indicates interfering transmissions between a UE 120 and a BS 110.

Figure 2:
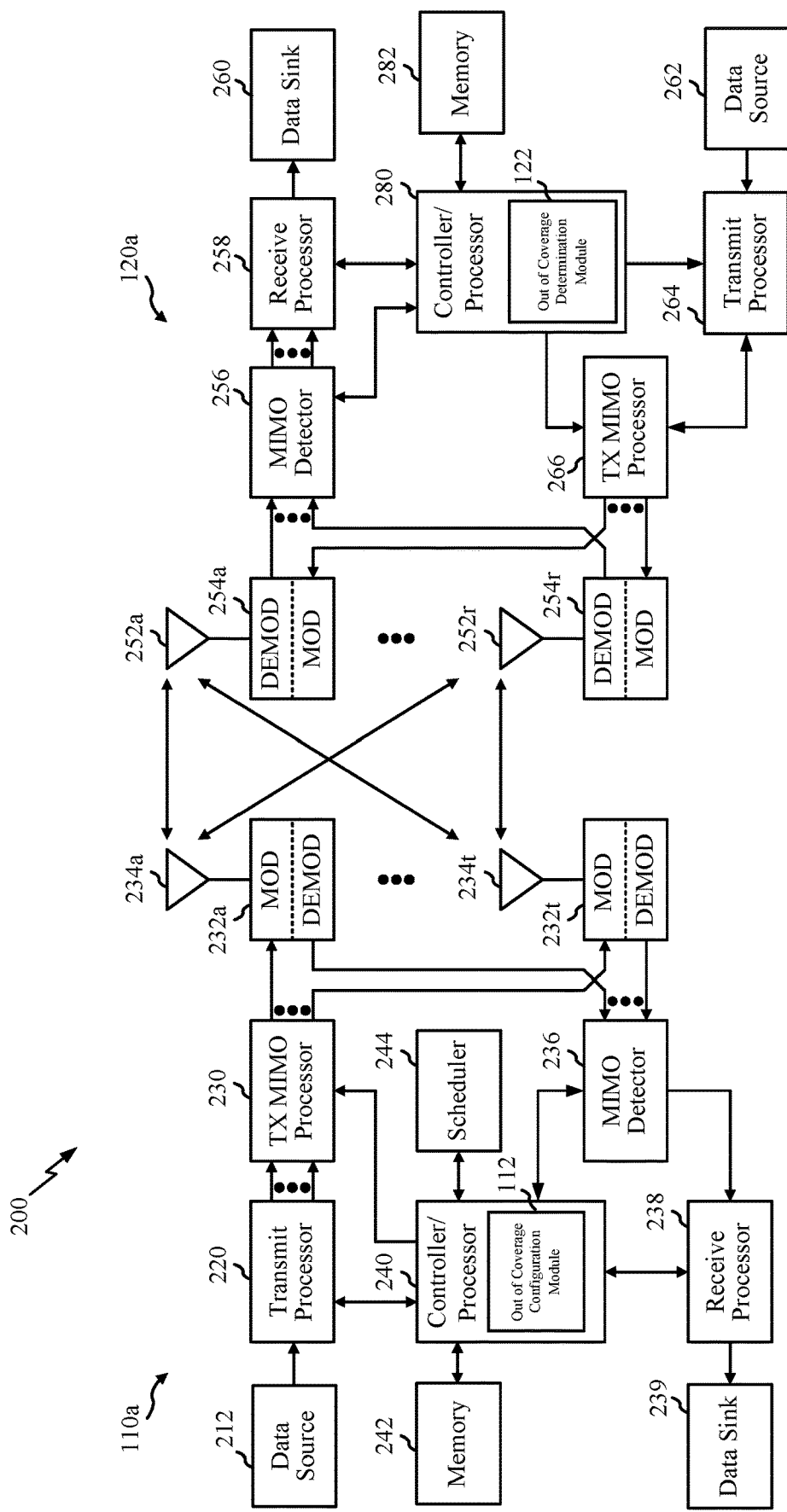
FIG. 2 illustrates example components of a base station (BS) and a user equipment (UE), which may be used to implement aspects of the present disclosure.

FIG. 2 illustrates example components of BS 110a and UE 120a (e.g., in the wireless communication network 100 of FIG. 1), which may be used to implement aspects of the present disclosure. For example, as shown in FIG. 2, antennas 252, processors 266, 258, 264, and/or controller/processor 280, which includes out of coverage determination module 122, of the UE 120a may be configured to perform (or cause UE 120a to perform) operations 500 of FIG. 5. Similarly, antennas 234, processors 230, 238, 220, and/or controller/processor 240, which includes out of coverage configuration module 112, of the BS 110a may be configured to perform (or cause BS 110a to perform) operations 600 of FIG. 6.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a DL signal. DL signals from modulators 232a-232t may be transmitted via the antennas 234a-234t, respectively.

At the UE 120a, the antennas 252a-252r may receive the DL signals from the BS 110a and may provide received signals to the demodulators (DEMODs) in transceivers 254a-254r, respectively. Each demodulator may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (for example, demodulate, deinterleave, and decode) the detected symbols, provide decoded data for the UE 120a to a data sink 260, and provide decoded control information to a controller/processor 280.

On the UL, at UE 120a, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110a. At the BS 110a, the UL signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the DL or UL.

Figure 3A:
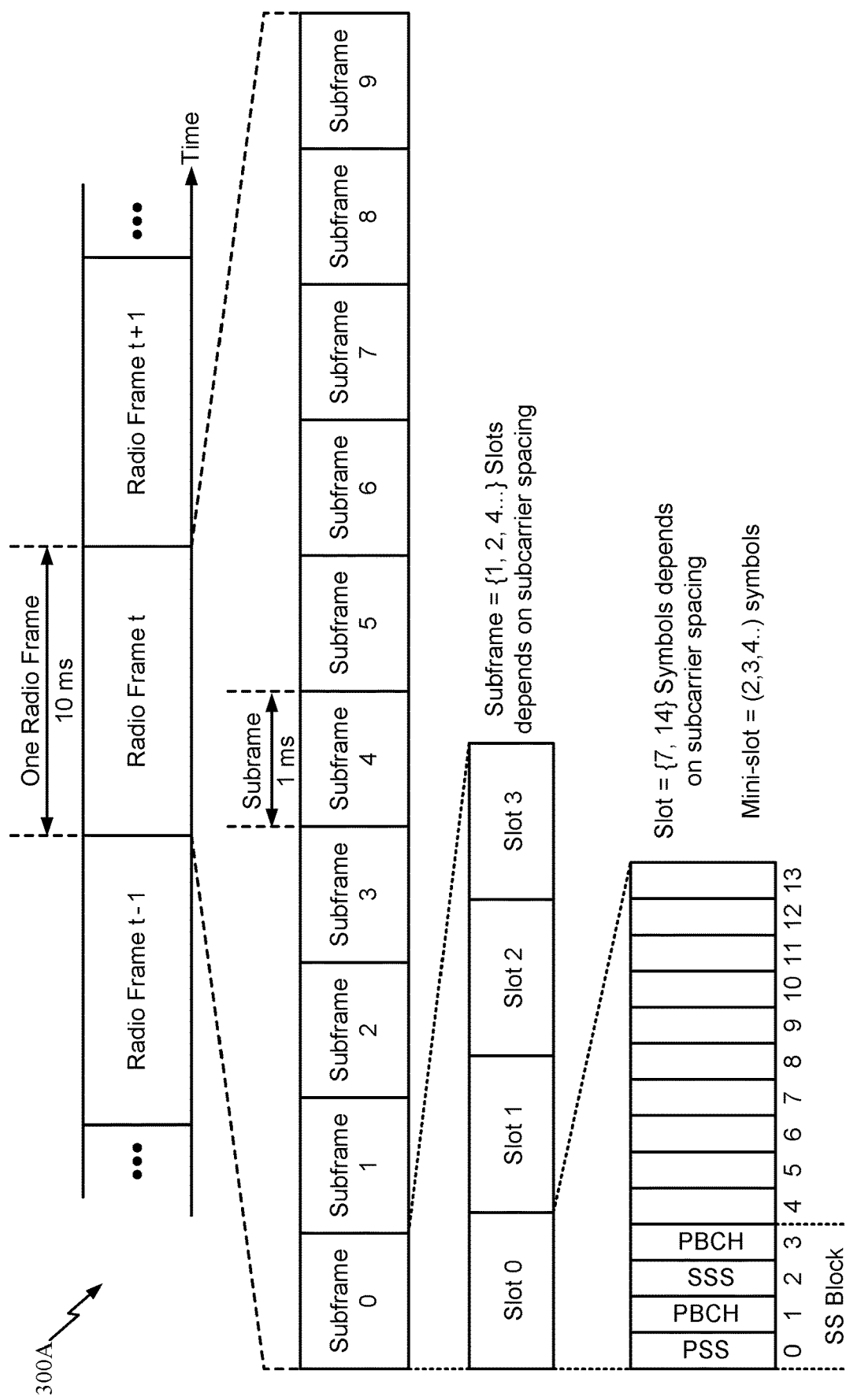
FIG. 3A illustrates an example of a frame format for a telecommunication system.

FIG. 3A is a diagram showing an example of a frame format 300 for NR. The transmission timeline for each of the DL and UL may be partitioned into units of radio frames. Each radio frame may have a predetermined duration (e.g., 10 milliseconds (ms)) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing (SCS). The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. The SSB includes a PSS, a SSS, and a two symbol PBCH. The SSB can be transmitted in a fixed slot location, such as the symbols 0-3 as shown in FIG. 3A. The PSS and SSS may be used by UEs for cell search and acquisition. The PSS may provide half-frame timing, and the SSS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmW. The up to sixty-four transmissions of the SSB are referred to as the SS burst set. SSBs in an SS burst set are transmitted in the same frequency region, while SSBs in different SS bursts sets can be transmitted at different frequency locations.

Figure 3B:
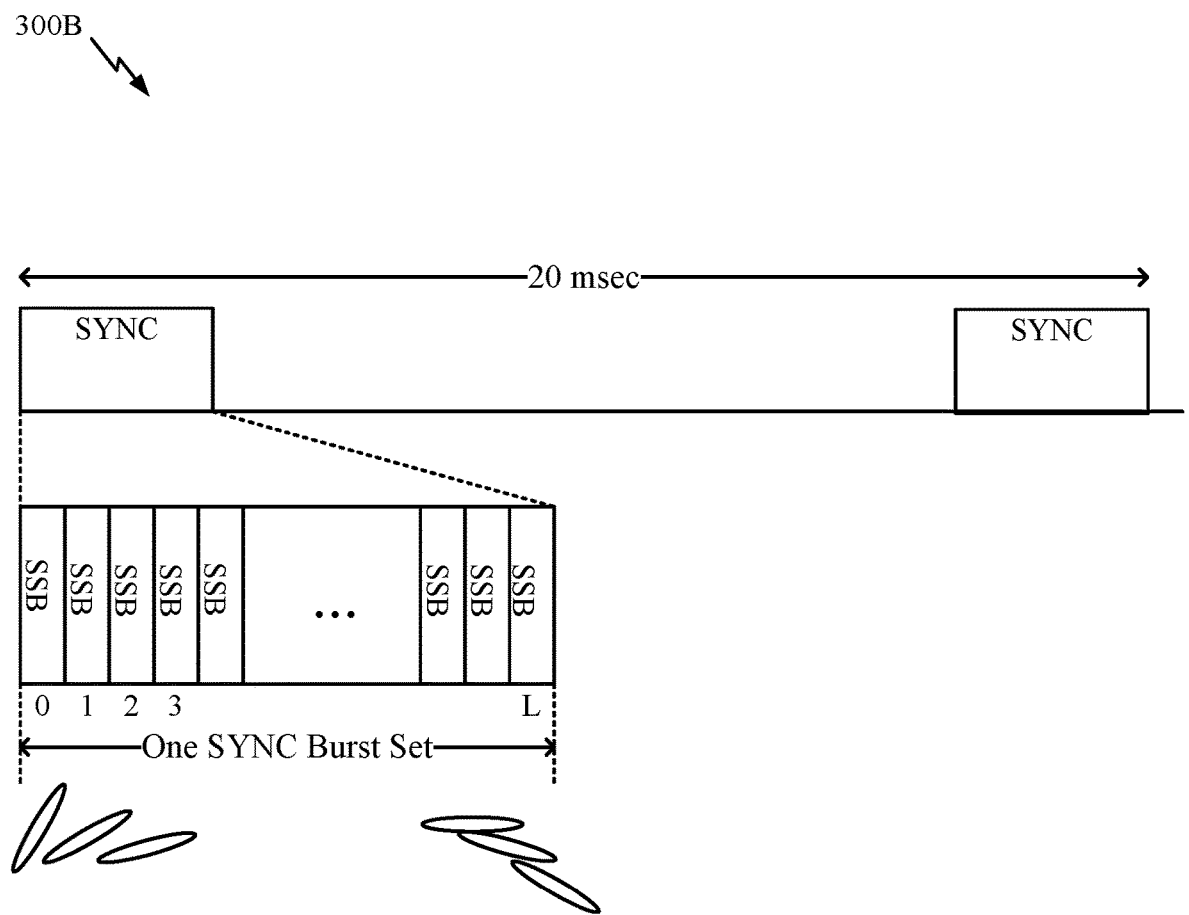
FIG. 3B illustrates how different synchronization signal blocks (SSBs) may be sent using different beams.

As shown in FIG. 3B, the SSBs may be organized into SS burst sets to support beam sweeping. As shown, each SSB within a burst set may be transmitted using a different beam, which may help a UE quickly acquire both transmit (TX) and receive (RX) beams (particular for mmW applications). A physical cell identity (PCI) may still be decoded from the PSS and SSS of the SSB.

Example Out of Coverage Determination

Some wireless communications systems may support transmission of feedback in order to increase communication reliability. For example, a user equipment (UE) may fail to decode a downlink (DL) message and provide feedback to a network entity (e.g., a base station (BS)) indicating one or more reasons for (error causes of) the cause of the failure. Examples of possible reasons for the cause of the failure may include (1) the receiving UE being out of coverage, (2) beam blocking, (3) partial beam blocking, (4) interference, and/or (5) frequency selective fading.

In some cases, a UE may provide such feedback via one or more physical uplink control channel (PUCCH) transmissions. Feedback information provided by the UE may include information a network entity may use when deciding on a radio link adaptation action, such as a beam switch, subband switch, or a lower modulation and coding scheme (MCS).

Figure 4:
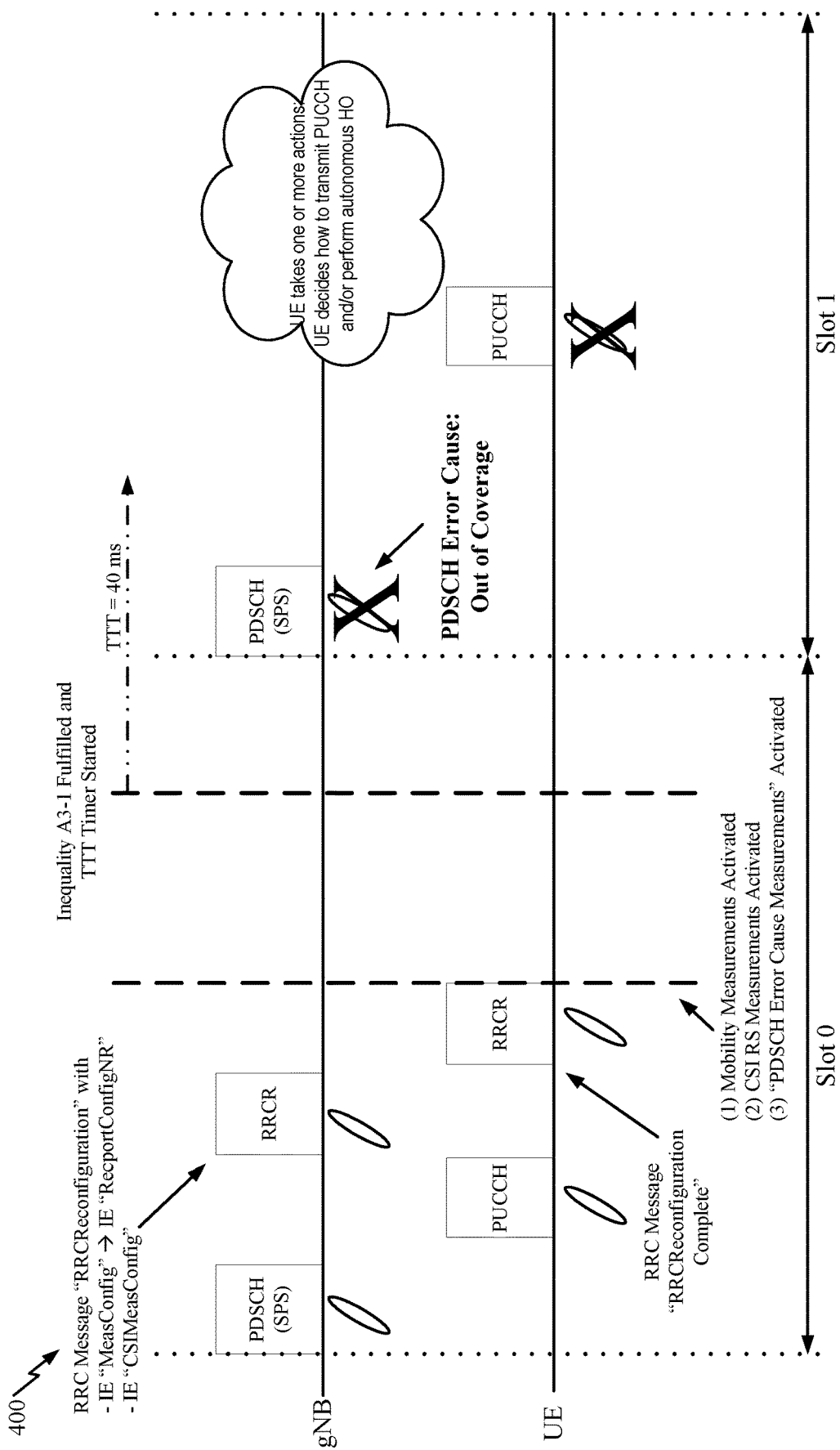
FIG. 4 illustrates an example out of coverage scenario that may be addressed in accordance with certain aspects of the present disclosure.

FIG. 4 illustrates an example timeline 400 for a UE that detects an out of coverage scenario, in accordance with certain aspects of the present disclosure. As illustrated in FIG. 4, a radio resource control reconfiguration (RRCR) message may be transmitted by a gNB on a first beam and received by a UE on a corresponding receive beam. After successful completion of the RRC connection reconfiguration between the gNB and UE, physical downlink shared channel (PDSCH) Error Cause Measurements, mobility measurements, and channel state information (CSI) reference signal (RS) measurements may be activated.

In an illustrative example, it may be assumed that, at least initially (e.g., in Slot 0), a mobility event trigger condition (Inequality A3) has not been met. As used herein, a mobility event trigger condition may be met when signal strength between the UE and a current cell drops below a threshold and there exists a neighbor cell with a better signal strength. In some cases, the identified neighbor cell is a threshold amount better than the current cell.

As illustrated, in Slot 1, the UE may fail to receive and decode a PDSCH (e.g., semi-persistent scheduled (SPS) PDSCH) transmitted by the gNB and the UE may further determine that the UE was unable to decode the PDSCH (e.g., DL transmission) because the UE was out of coverage (e.g., determine it was an out of coverage error cause). Accordingly, the UE may be challenged with a decision on how to transmit PUCCH indicating negative acknowledgement (NACK) feedback, given that uplink (UL) beam sweeping may not be sufficient when the UE is out of coverage.

For example, when a UE is unsuccessful in receiving and decoding a DL transmission, then the UE may attempt to transmit NACK feedback to the network by applying UL beam sweeping. In cases where the decoding error occurred due to beam blocking in the DL, then it may be assumed that beam blocking is also present in the UL (e.g., due to channel reciprocity); therefore, the UE may apply beam sweeping for transmission. The UE may transmit NACK feedback on all active beams (e.g., up to eight active beams), and still fail to receive feedback from the network. Accordingly, UL beam sweeping may be said to be insufficient given the UE is unable to communicate feedback to the network.

Aspects of the present disclosure relate to wireless communications, and more particularly, to techniques for taking one or more actions when a UE determines a failure to receive and decode at least one scheduled DL transmission is based, at least in part, on the UE being out of coverage.

Figure 5:
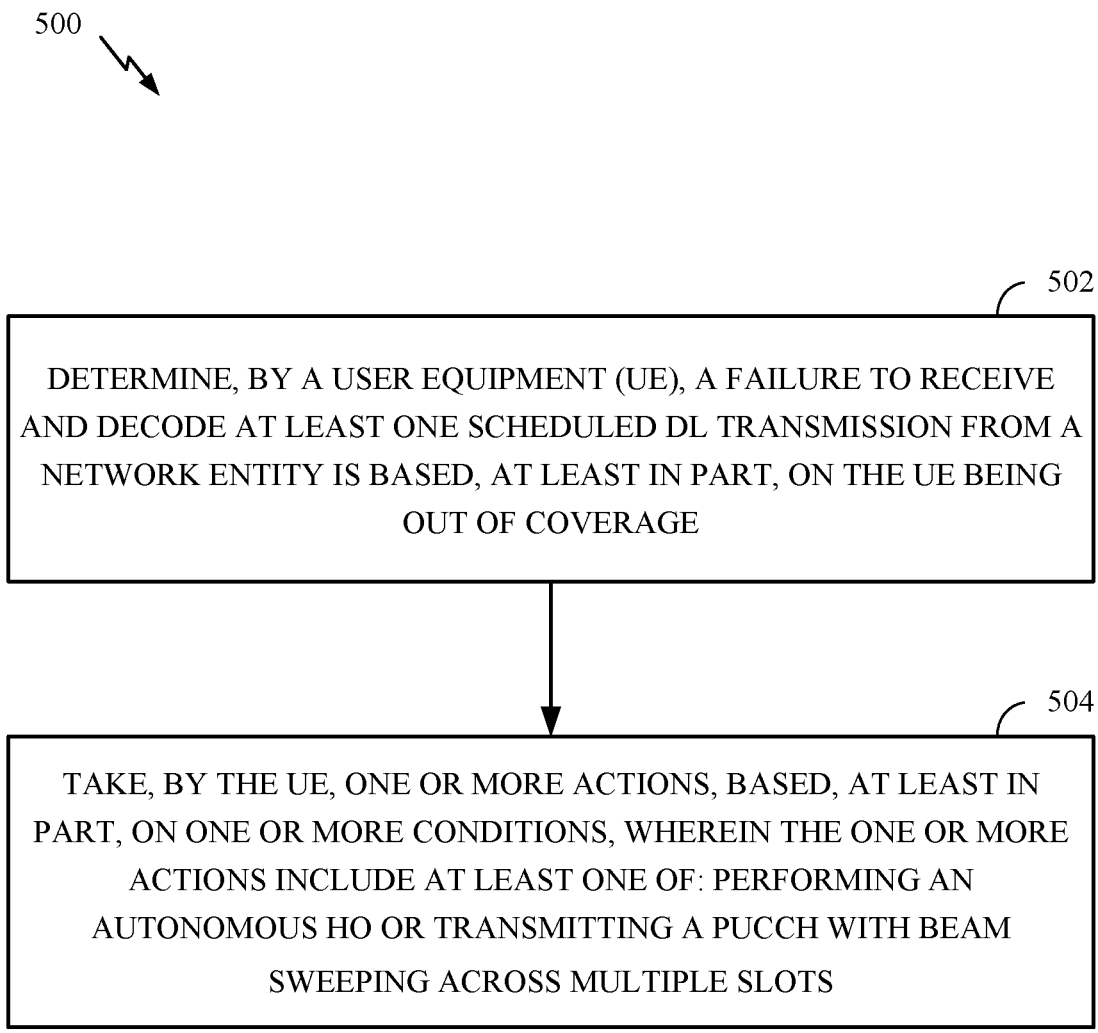
FIG. 5 is a flow diagram illustrating example operations for wireless communication by a UE, in accordance with certain aspects of the present disclosure.

FIG. 5 is a flow diagram illustrating example operations 500 for wireless communication by a UE, in accordance with certain aspects of the present disclosure. For example, operations 500 may be performed by UE 120a of FIGS. 1 and 2 to detect an out of coverage scenario and take action, in accordance with certain aspects of the present disclosure. The operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 500 begin, at block 502, by a UE determining a failure to receive and decode at least one scheduled DL transmission from a network entity is based, at least in part, on the UE being out of coverage. At block 504, the UE takes one or more actions, based, at least in part, on one or more conditions, wherein the one or more actions include at least one of: performing an autonomous HO; or transmitting a PUCCH with beam sweeping across multiple slots.

Figure 6:
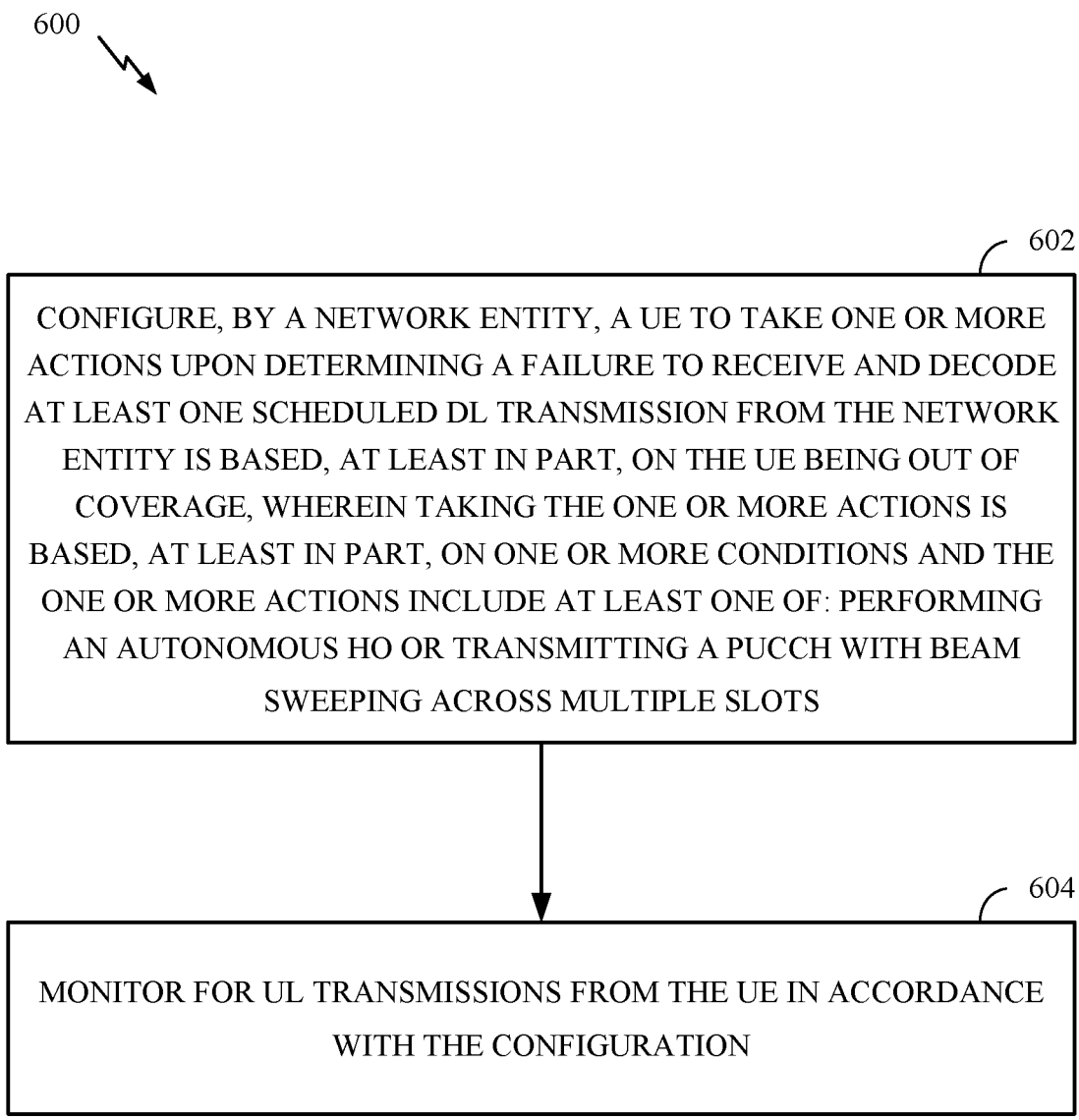
FIG. 6 is a flow diagram illustrating example operations for wireless communication by a network entity, in accordance with certain aspects of the present disclosure.

FIG. 6 is a flow diagram illustrating example operations 600 that may be performed by a network entity, in accordance with certain aspects of the present disclosure. The operations 600 may be considered complementary to operations 500 of FIG. 5 performed by a UE. For example, operations 600 may be performed by BS 110a of FIGS. 1 and 2 (e.g., a gNB) to configure a UE (performing operations 500 of FIG. 5) to detect an out of coverage scenario and take action, in accordance with certain aspects of the present disclosure. The operations 600 may be implemented as software components that are executed and run on one or more processors (e.g., controller/processor 240 of FIG. 2). Further, the transmission and reception of signals by the network entity in operations 600 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

Operations 600 begin, at block 602, by a network entity configuring a UE to take one or more actions upon determining a failure to receive and decode at least one scheduled DL transmission from the network entity is based, at least in part, on the UE being out of coverage, wherein taking the one or more actions is based, at least in part, on one or more conditions and the one or more actions include at least one of: performing an autonomous HO or transmitting a PUCCH with beam sweeping across multiple slots. At block 604, the network entity monitors for UL transmissions from the UE in accordance with the configuration.

Figure 7:
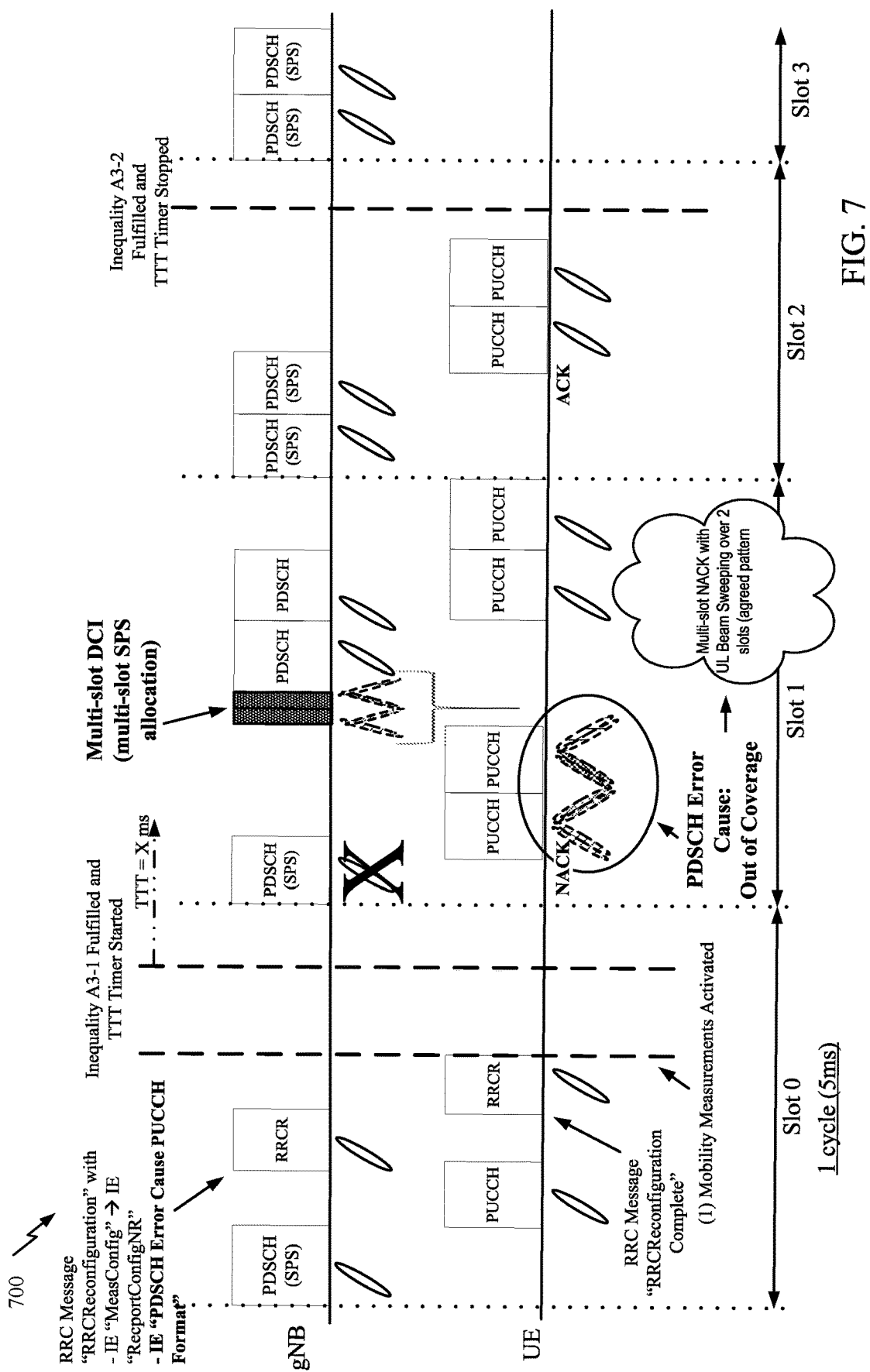
FIG. 7 illustrates an example action a UE may take after detecting an out of coverage scenario, in accordance with some aspects of the present disclosure.

FIG. 7 illustrates an example action 700 a UE may take after detecting an out of coverage scenario, in accordance with some aspects of the present disclosure. As described with respect to FIGS. 5 and 6, in some cases, the one or more actions a UE may take after determining a failure to receive and decode at least one scheduled DL transmission is based, at least in part, on the UE being out of coverage (e.g., detecting an out of coverage error cause) may include transmitting a PUCCH with beam sweeping across multiple slots, as illustrated in the example shown in FIG. 7.

Figure 8:
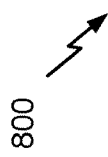
FIG. 8 illustrates an example configuration for out of coverage detection, in accordance with some aspects of the present disclosure.

Similar to FIG. 4, in FIG. 7, a UE may receive an RRCR message transmitted by a gNB. However, in FIG. 7, the RRC signaling may also configure the UE with a PDSCH error cause PUCCH format. FIG. 8 shows an example of such information. FIG. 8 illustrates an example configuration 800 for out of coverage detection, in accordance with some aspects of the present disclosure. As illustrated, the configuration 800 may include at least one of: a number of beams for the beam sweeping, a number of slots per beam, or a beam order for the beam sweeping. Via the configuration, the gNB may grant the UE resources for subsequent multi-slot beam sweeping for PUCCH transmissions.

In other words, configuring the UE with a PDSCH error cause PUCCH format may configure the UE with a pattern for beam sweeping across multiple slots. For example, the pattern may indicate the UE is to send multiple PUCCHs (e.g., with NACK feedback) with the same beam within a slot and which (different) beams for the UE to use for PUCCH transmissions in different slots. Therefore, in accordance with the configuration, upon detecting an out of coverage error cause, the UE may send a PUCCH (NACK) with UL beam sweeping across multiple slots.

Beam sweeping PUCCH across multiple slots in this manner may be beneficial, for example, in cases where HO of the UE is not an option for some reasons described herein. Beam sweeping PUCCH, subsequent to failing to decode a DL transmission and determining the failure occurred due to the UE being out of coverage, may allow the network to detect the out of coverage scenario and avoid interruptions, which may be particularly undesirable for certain types of traffic, such as ultra reliable low latency communication (URLLC).

Referring back to FIG. 7, in Slot 1, the UE may fail to receive and decode a PDSCH transmitted by the gNB and further determine that the UE was unable to decode the DL transmission because the UE was out of coverage. Accordingly, in accordance with the PDSCH error cause PUCCH format configuration, the UE may decide to transmit a PUCCH with beam sweeping across multiple slots. More specifically, the beam sweeping across multiple slots may include transmitting multiple PUCCHS with the same beam within a slot and using different beams for PUCCH transmission in different slots.

As shown in FIG. 7, the UE may transmit a first PUCCH using four activated beams and transmit a second PUCCH, where the second PUCCH is a repetition of the first PUCCH, using the four activated beams in Slot 1. Accordingly, repetition of the PUCCH may extend coverage.

When the gNB receives, from the UE, the NACK feedback indicating that the packet (e.g., PDSCH) has not been decoded correctly and that the reason a failure to decode has occurred is because the UE is out of coverage, then the gNB's response may be to allocate multiple resources for transmission of the same packet (e.g., PDSCH) on multiple beams. As shown in FIG. 7, the gNB may reply with a multi-slot downlink control information (DCI) and repeated PDSCH transmissions to the UE. The gNB may also apply beam sweeping and repetition across multiple slots to extend the coverage. Specifically, the first PDSCH may be transmitted using a first beam, and the second PDSCH may be transmitted using a second beam (thereby increasing diversity). Because a gNB has multiple panels, one panel may be used to form the first beam and a second panel may be used to form the second beam. Both of these panels/beams may point to the same UE, and the same packet may be transmitted via the two different beams.

In some cases, the UE may be configured with more than one possible action to take and may need to make a decision on which action to take after detecting an out of coverage error cause. For example, in some cases, a UE may need to decide between performing an autonomous HO (e.g., perform HO without being explicitly instructed by another entity to perform the HO) or transmit a PUCCH with beam sweeping across multiple slots. The decision may depend on one or more conditions being met. Determining the one or more conditions are met may include determining (1) whether the UE has been configured for multi-slot PUCCH beam sweeping, (2) whether a mobility triggering condition has been met, (3) whether a calculated time (e.g., a percentage of a ratio of an elapsed time since the mobility trigger was met and a configured time to trigger (TTT) value) is greater than the configured TTT value, or any combination thereof.

Figure 9:
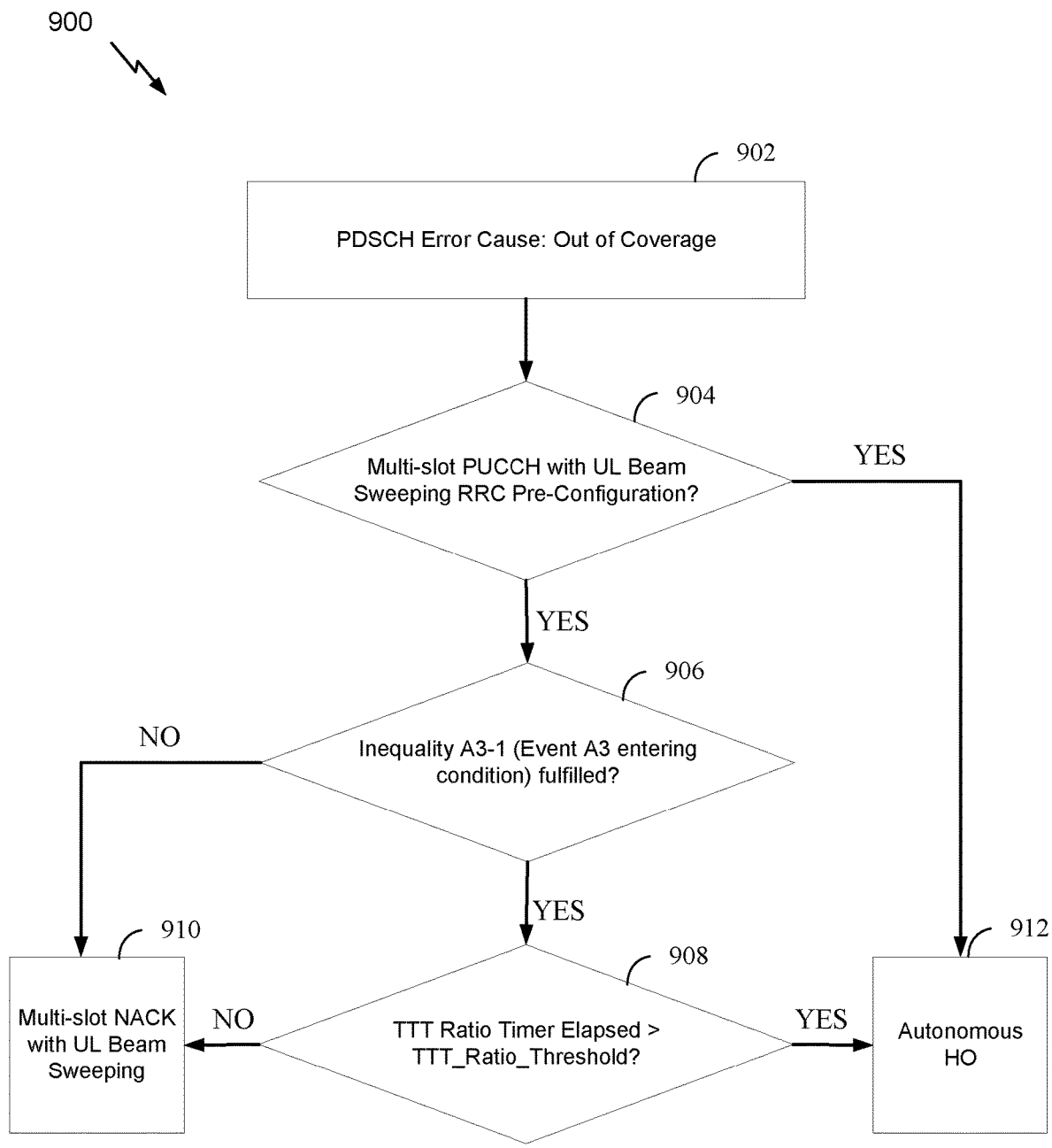
FIG. 9 illustrates example actions a UE may take after detecting an out of coverage scenario, in accordance with some aspects of the present disclosure.

For example, as illustrated in FIG. 9, the UE may be configured to perform an autonomous HO or transmit a PUCCH with beam sweeping across multiple slots, depending on one or more conditions, when an out of coverage scenario is detected.

FIG. 9 illustrates example actions a UE may take after detecting an out of coverage scenario, in accordance with some aspects of the present disclosure. As illustrated, following detection of an out of coverage error cause at 902, if the UE is not configured to transmit PUCCH with beam sweeping across multiple slots at 904, the UE may perform an autonomous HO at 912.

If the UE is configured to transmit PUCCH with beam sweeping across multiple slots at 904, then the decision on whether to perform autonomous HO or transmit PUCCH with beam sweeping across multiple slots may depend on whether an A3 condition (e.g., referred to herein as a mobility trigger condition) is met at 906. As described herein, the one more conditions may involve a mobility trigger condition (e.g., trigger A3) indicating a neighbor cell is better than a current serving cell. In such cases, the UE may be configured to transmit PUCCH with beam sweeping across multiple slots at 910 if the mobility trigger condition is not met. According to certain aspects, the A3 condition(s) may be chosen strategically, for example, to result in autonomous HO only when multi-slot PUCCH is not possible, or when multi-slot PUCCH is possible and a mobility event trigger has been fulfilled for some amount of time.

For example, the UE may be configured to perform an autonomous HO if the mobility trigger condition is met for a calculated time at 908 (and where the UE is configured to transmit PUCCH with beam sweeping across multiple slots at 904 and a mobility trigger condition has been fulfilled at 906). As used herein, the calculated time may be based on a percentage of ratio of an elapsed time since the mobility trigger was met and the configured TTT value. In this manner, the techniques presented herein may result in faster HO (not waiting the full TTT time) in the event an out of coverage error cause is detected. This may help speed up recovery and allow a UE to resume communication in another cell faster.

Accordingly, if the mobility trigger condition (A3 condition) is met at 906, but has not been met for the calculated time at 908, then the UE may (continue to) transmit PUCCH with beam sweeping across multiple slots. If the mobility trigger condition (A3 condition) is met at 906 and has been met for the calculated time at 908, then the UE may perform autonomous HO at 912.

Referring back to FIG. 7, and similar to FIG. 4, prior to and at completion of the RRC reconfiguration, a mobility event trigger condition (A3) may not be met. However, at a subsequent time within Slot 1, the mobility trigger condition (A3) indicating a neighbor cell is better than a current serving cell may be fulfilled. In this case, a time to trigger (TTT) timer may be started and may run for a configured amount of time. As shown in FIG. 7, the TTT timer may be set to TTT=X milliseconds (ms) (e.g., where X is an integer greater than 0) and run for X ms.

Given the UE transmits multi-slot NACK with UL beam sweeping in Slot 1, instead of performing an autonomous HO, it may be assumed that the calculated time is less than the configured TTT value (e.g., TTT Radio Timer Elapsed<TTT_Ratio_Threshold as shown at 908 in FIG. 9). Although not shown in FIG. 7, in some cases, where the calculated time is greater than the configured TTT value (e.g., TTT Radio Timer Elapsed>TTT_Ratio_Threshold as shown at 908 in FIG. 9), then the UE may skip multi-slot, UL beams sweeping of NACK and instead perform the autonomous HO. In one illustrative example, the TTT timer is set to 40 ms, and a TTT ratio threshold is set to 50%. If 30 ms have elapsed since the mobility trigger was met, the UE may perform autonomous HO because the ratio threshold of 50% was met (e.g., 30 ms elapsed time/40 ms TTT time=0.75=75%, which is greater than the configured TTT ratio threshold of 50% in this example).

According to certain aspects, the UE may be sent a configuration, with the configuration effectively serving as instructions for how and when the UE is to transmit multi-slot PUCCH (NACK) or perform autonomous HO, upon detecting an out of coverage error cause. FIG. 10 illustrates an example configuration 1000 for out of coverage detection, in accordance with some aspects of the present disclosure. As illustrated in FIG. 10, the configuration may indicate (1) whether a UE is configured to perform an autonomous HO or transmit PUCCH with beam sweeping across multiple slots, depending on one or more conditions, upon detecting an out of coverage error cause, (2) a number of slots for transmitting a PUCCH with beam sweeping, and/or (3) a parameter for calculating the calculated time based on the configured TTT value. In some cases the value of the parameter for calculating the calculated time based on the configured TTT value depends, at least in part, on a traffic service type (e.g., the value of % TTT elapsed may be set to a higher percentage value for ultra reliable low latency communication (URLLC) compared to other types of traffic-to avoid HO and associated interruptions). For example, the TTT_Ratio_Threshold as shown at 908 in FIG. 9 may be set to 80% for URLLC while other communications have a TTT_Ratio_Threshold below 80%.

Condition based decisions on what action a UE may take upon detecting an out of coverage scenario may have some benefits. For example, the condition based approach presented in this disclosure may result in higher reliability due to an appropriate PUCCH format (sent with beam sweeping over multiple slots) when the UE is out of coverage. As noted above, the conditions may also result in faster HO when the UE detects that it is out of coverage and there is a lack of ambiguity between peers. The condition-based approach may also result in lower latency, for example, due to appropriate radio link adaptation (based on feedback of the error cause and/or a recommended action) and/or due to the UE being instructed on what actions to take (based on the configuration as shown in FIG. 10).

Example Wireless Communications Devices

Figure 11:
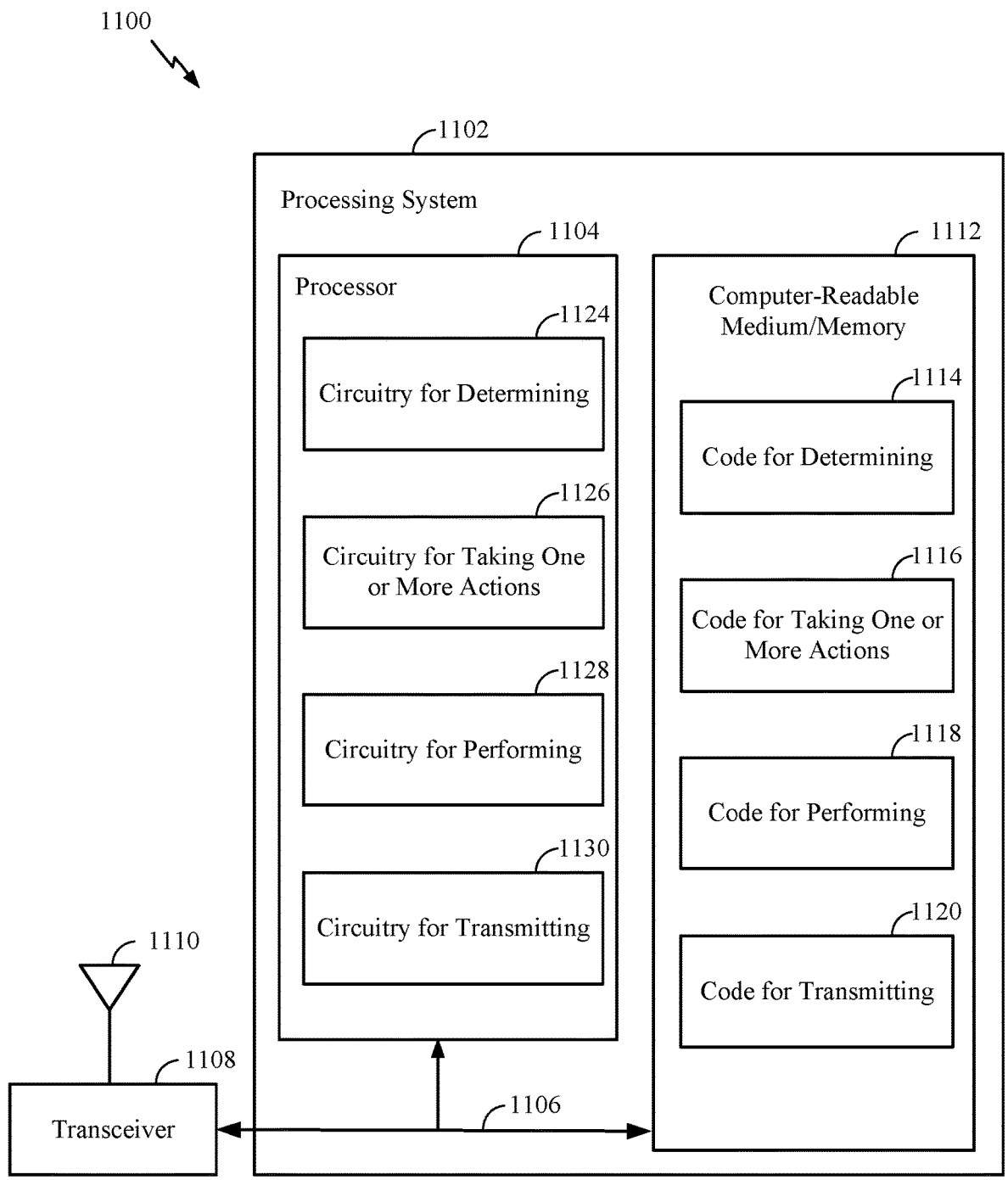
FIG. 11 illustrates a communications device that may include various components configured to perform operations for the techniques disclosed herein, in accordance with aspects of the present disclosure.

FIG. 11 illustrates a communications device 1100 that may include various components (e.g., corresponding to means-plus-function components) operable, configured, or adapted to perform operations for the techniques disclosed herein, such as the operations depicted and described with respect to FIG. 5. In some examples, communications device 1100 may be a user equipment (UE), such as UE 120*a* described with respect to FIGS. 1 and 2.

Communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

Processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 5, or other operations for performing the various techniques discussed herein.

In certain aspects, computer-readable medium/memory 1112 stores code 1114 for determining; code 1116 for taking one or more actions; code 1118 for performing; and code 1120 for transmitting.

In some cases, code 1114 for determining may include code for determining a failure to receive and decode at least one scheduled DL transmission from a network entity is based, at least in part, on the UE being out of coverage. In some cases, code 1116 for taking one or more actions may include code for taking one or more actions, based, at least in part, on one or more conditions. In some cases, code 1118 for performing may include code for performing an autonomous HO. In some cases, code 1120 for transmitting may include code for transmitting a PUCCH with beam sweeping across multiple slots.

In certain aspects, the processor 1104 has circuitry configured to implement the code stored in the computer-readable medium/memory 1112. The processor 1104 includes circuitry 1124 for determining; circuitry 1126 for taking one or more actions; circuitry 1128 for performing; and circuitry 1130 for transmitting.

In some cases, circuitry 1124 for determining may include circuitry for determining a failure to receive and decode at least one scheduled DL transmission from a network entity is based, at least in part, on the UE being out of coverage. In some cases, circuitry 1126 for taking one or more actions may include circuitry for taking one or more actions, based, at least in part, one or more conditions. In some cases, circuitry 1128 for performing may include circuitry for performing an autonomous HO. In some cases, circuitry 1128 for transmitting may include circuitry for transmitting a PUCCH with beam sweeping across multiple slots.

In some cases, the operations illustrated in FIG. 5, as well as other operations described herein, may be implemented by one or more means-plus-function components. For example, in some cases, such operations may be implemented by means for determining, means for taking one or more actions, means for performing, and means for transmitting.

In some cases, means for determining, means for taking one or more actions, means for performing, includes a processing system, which may include one or more processors, such as the receive processor 258, the transmit processor 264, the TX MIMO processor 266, and/or the controller/processor 280 of the UE 120*a* illustrated in FIG. 2 and/or the processing system 1102 of the communication device 1100 in FIG. 11.

The transceiver 1108 may provide a means for receiving or transmitting information such as packets, user data, or control information associated with various information channels (e.g., control channels, data channels, information related to SR, etc.). Information may be passed on to other components of the communications device 1100. The antenna 1110 may correspond to a single antenna or a set of antennas. The transceiver 1108 may provide means for transmitting signals generated by other components of the communications device 1100.

Means for receiving or means for obtaining may include a receiver (such as the receive processor 258) or antenna(s) 252 of the UE 120*a* illustrated in FIG. 2. Means for transmitting or means for outputting may include a transmitter (such as the transmit processor 264) or antenna(s) 252 of the UE 120*a* illustrated in FIG. 2.

Notably, FIG. 11 is just use one example, and many other examples and configurations of communications device 1100 are possible.

Figure 12:
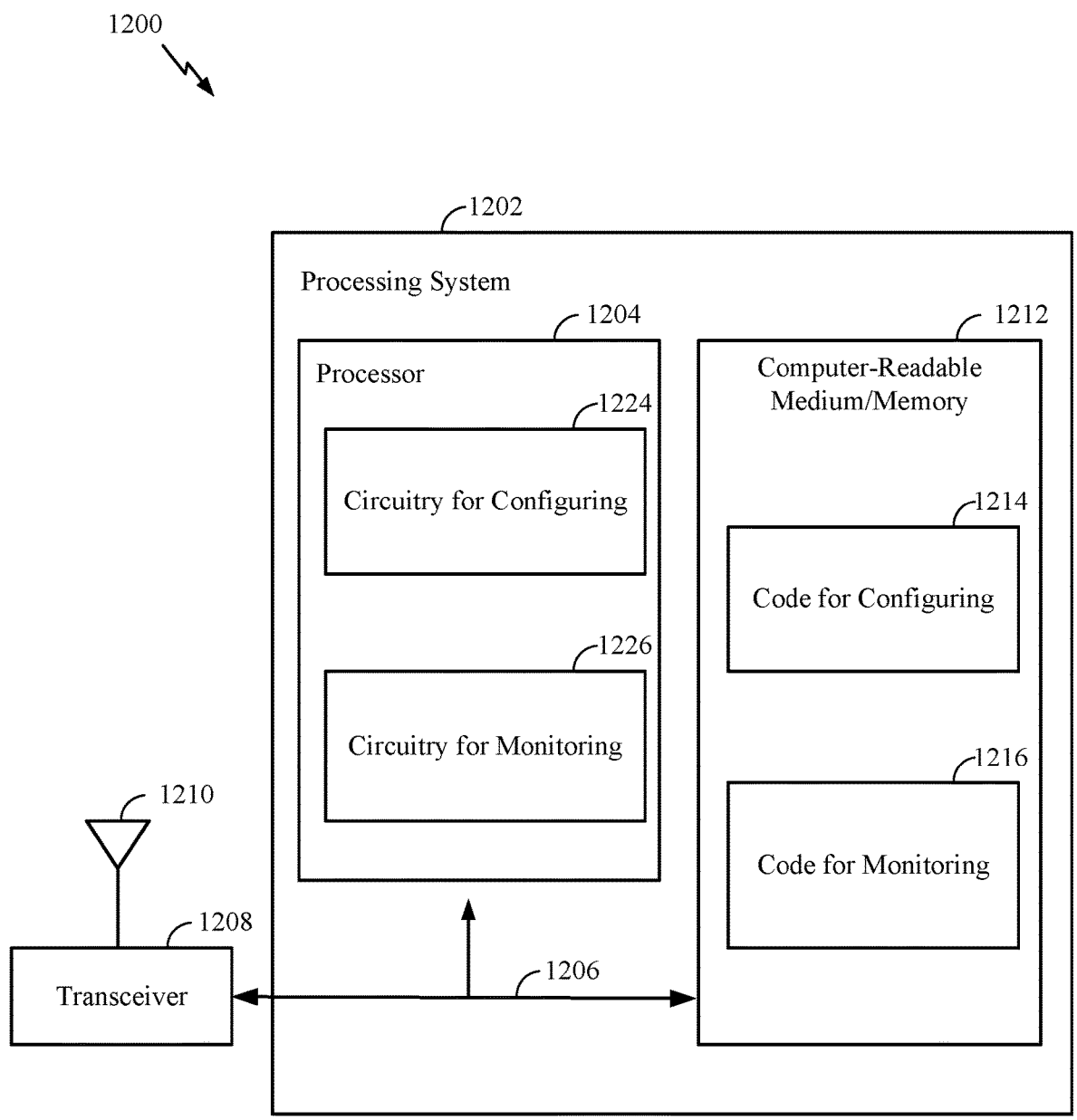
FIG. 12 illustrates a communications device that may include various components configured to perform operations for the techniques disclosed herein, in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 6. In some examples, communications device 1200 may be a base station (BS) (e.g., gNB), such as BS 110*a* described with respect to FIGS. 1 and 2.

Communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 6, or other operations for performing the various techniques discussed herein.

In certain aspects, computer-readable medium/memory 1212 stores code 1214 for configuring; and code 1214 for monitoring.

In some cases, code 1214 for configuring may include code for configuring a UE to take one or more actions upon determining a failure to receive and decode at least one scheduled DL transmission from the network entity is based, at least in part, on the UE being out of coverage, wherein taking the one or more actions is based, at least in part, on one or more conditions and the one or more actions include at least one of: performing an autonomous HO; or transmitting a PUCCH with beam sweeping across multiple slots. In some cases, code 1216 for monitoring may include code for monitoring for UL transmissions from the UE in accordance with the configuration.

In certain aspects, the processor 1204 has circuitry configured to implement the code stored in the computer-readable medium/memory 1212. The processor 1204 includes circuitry 1224 for configuring; and circuitry 1226 for monitoring.

In some cases, circuitry 1224 for configuring may include circuitry for configuring a UE to take one or more actions upon determining a failure to receive and decode at least one scheduled DL transmission from the network entity is based, at least in part, on the UE being out of coverage, wherein taking the one or more actions is based, at least in part, on one or more conditions and the one or more actions include at least one of: performing an autonomous HO; or transmitting a PUCCH with beam sweeping across multiple slots. In some cases, circuitry 1226 for monitoring may include circuitry for monitoring for UL transmissions from the UE in accordance with the configuration.

In some cases, the operations illustrated in FIG. 6, as well as other operations described herein, may be implemented by one or more means-plus-function components. For example, in some cases, such operations may be implemented by means for configuring and means for monitoring.

In some cases, means for configuring and means for monitoring, includes a processing system, which may include one or more processors, such as the receive processor 238, the transmit processor 220, the TX MIMO processor 230, and/or the controller/processor 240 of the BS 110 illustrated in FIG. 2 and/or the processing system 1202 of the communication device 1200 in FIG. 12.

The transceiver 1208 may provide a means for receiving or transmitting information such as packets, user data, or control information associated with various information channels (e.g., control channels, data channels, information related to SR, etc.). Information may be passed on to other components of the communications device 900. The antenna 1210 may correspond to a single antenna or a set of antennas. The transceiver 1208 may provide means for transmitting signals generated by other components of the communications device 1200.

Means for receiving or means for obtaining may include a receiver (such as the receive processor 238) or antenna(s) 234 of the BS 110*a* illustrated in FIG. 2. Means for transmitting or means for outputting may include a transmitter (such as the transmit processor 220) or antenna(s) 234 of the BS 110*a* illustrated in FIG. 2.

Notably, FIG. 12 is just use one example, and many other examples and configurations of communications device 1200 are possible.

EXAMPLE CLAUSES

Implementation examples are described in the following numbered clauses:

Clause 1: A method for wireless communications by a user equipment (UE), comprising: determining a failure to receive and decode at least one scheduled downlink (DL) transmission from a network entity is based, at least in part, on the UE being out of coverage; and taking one or more actions, based, at least in part, on one or more conditions, wherein the one or more actions include at least one of: performing an autonomous handover (HO); or transmitting a physical uplink control channel (PUCCH) with beam sweeping across multiple slots.

Clause 2: The method of Clause 1, wherein transmitting the PUCCH with beam sweeping across multiple slots is based, at least in part, on a pre-arrangement with the network entity, wherein the pre-arrangement includes a pattern for the beam sweeping across multiple slots.

Clause 3: The method of Clause 1 or 2, wherein the beam sweeping across multiple slots comprises: transmitting multiple PUCCHs with a same beam within a slot; and using different beams for PUCCH transmissions in different slots.

Clause 4: The method of any of Clauses 1-3, further comprising receiving a PUCCH configuration indicating a format for the PUCCH.

Clause 5: The method of Clause 4, wherein the PUCCH configuration indicates at least one of: a number of beams for the beam sweeping; a number of slots per beam; or a beam order for the beam sweeping.

Clause 6: The method of any of Clauses 1-5, wherein the UE is configured to perform an autonomous HO if the UE is not configured to transmit PUCCH with beam sweeping across multiple slots.

Clause 7: The method of any of Clauses 1-6, wherein at least one of the one or more conditions involves a mobility trigger condition indicating a neighbor cell is better than a current serving cell.

Clause 8: The method of Clause 7, wherein the UE is configured to transmit PUCCH with beam sweeping across multiple slots where the mobility trigger condition is not met.

Clause 9: The method of Clause 7 or 8, wherein the UE is configured to perform the autonomous HO where the mobility trigger condition is met for a calculated time.

Clause 10: The method of Clause 9, wherein the UE is configured to transmit PUCCH with beam sweeping across multiple slots where the mobility trigger condition has not yet been met for the calculated time.

Clause 11: The method of Clause 9 or 10, wherein the calculated time is less than a configured time to trigger timer (TTT) value.

Clause 12: The method of any of Clauses 9-11, wherein the calculated time is based on a percentage of ratio of an elapsed time since the mobility trigger condition was met and a configured TTT value.

Clause 13: The method of any of Clauses 1-12, further comprising receiving a configuration indicating at least one of: whether the UE is configured to perform the autonomous HO or transmit a PUCCH with beam sweeping across multiple slots, depending on one or more conditions, upon determining a failure to receive and decode at least one scheduled DL transmission from a network entity is based, at least in part, on the UE being out of coverage; a number of slots for transmitting a PUCCH with beam sweeping; or a parameter for calculating a calculated time based on a configured TTT value.

Clause 14: The method of Clause 13, wherein a value of the parameter depends, at least in part, on a traffic service type.

Clause 15: A method for wireless communications by a network entity, comprising: configuring a user equipment (UE) to take one or more actions upon determining a failure to receive and decode at least one scheduled downlink (DL) transmission from the network entity is based, at least in part, on the UE being out of coverage, wherein taking the one or more actions is based, at least in part, on one or more conditions and the one or more actions include at least one of: performing an autonomous handover (HO); or transmitting a physical uplink control channel (PUCCH) with beam sweeping across multiple slots; and monitoring for uplink (UL) transmissions from the UE in accordance with the configuration.

Clause 16: The method of Clause 15, further comprising configuring the UE with a pattern for the beam sweeping across multiple slots.

Clause 17: The method of Clause 15 or 16, wherein the beam sweeping across multiple slots comprises: transmitting multiple PUCCHs with a same beam within a slot; and using different beams for PUCCH transmissions in different slots.

Clause 18: The method of any of Clauses 15-17, wherein the configuring comprises transmitting the UE a PUCCH configuration indicating a format for the PUCCH.

Clause 19: The method of Clause 18, wherein the PUCCH configuration indicates at least one of: a number of beams for the beam sweeping; a number of slots per beam; or a beam order for the beam sweeping.

Clause 20: The method of any of Clauses 15-19, wherein the UE is configured to perform the autonomous HO where the UE is not configured to transmit PUCCH with beam sweeping across multiple slots.

Clause 21: The method of any of Clauses 15-20, wherein at least one of the one or more conditions involves a mobility trigger condition indicating a neighbor cell is better than a current serving cell.

Clause 22: The method of Clause 21, wherein the UE is configured to transmit PUCCH with beam sweeping across multiple slots where the mobility trigger condition is not met.

Clause 23: The method of Clause 21 or 22, wherein the UE is configured to perform the autonomous HO where the mobility trigger condition is met for a calculated time.

Clause 24: The method of Clause 23, wherein the UE is configured to transmit PUCCH with beam sweeping across multiple slots where the mobility trigger condition has not yet been met for the calculated time.

Clause 25: The method of Clause 23 or 24, wherein the calculated time is less than a configured time to trigger timer (TTT) value.

Clause 26: The method of any of Clauses 23-25, wherein the calculated time is based on a percentage of ratio of an elapsed time since the mobility trigger condition was met and a configured TTT value.

Clause 27: The method of any of Clauses 15-26, further comprising transmitting to the UE a configuration indicating at least one of: whether the UE is configured to perform the autonomous HO or transmit a PUCCH with beam sweeping across multiple slots, depending on one or more conditions, upon determining a failure to receive and decode at least one scheduled DL transmission from a network entity is based, at least in part, on the UE being out of coverage; a number of slots for transmitting a PUCCH with beam sweeping; or a parameter for calculating a calculated time based on a configured TTT value.

Clause 28: The method of Clause 27, wherein a value of the parameter depends, at least in part, on a traffic service type.

Clause 29: An apparatus, comprising: a memory comprising executable instructions; one or more processors configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95, and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU) carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIG. 5 and FIG. 6 may be performed by various processors shown in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 5 and FIG. 6.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
   determining a failure to receive and decode at least one scheduled downlink (DL) transmission from a network entity is based, at least in part, on the UE being out of coverage; and
   taking one or more actions based, at least in part, on determining the failure is based, at least in part, on the UE being out of coverage and one or more conditions, wherein the one or more actions include:
      transmitting a physical uplink control channel (PUCCH) with beam sweeping across multiple slots when the UE is configured to transmit PUCCH with beam sweeping across multiple slots; and
      performing an autonomous handover (HO) when the UE is not configured to transmit PUCCH with beam sweeping across multiple slots.

2. The method of claim 1, wherein transmitting the PUCCH with beam sweeping across multiple slots is based, at least in part, on a pre-arrangement with the network entity, wherein the pre-arrangement includes a pattern for the beam sweeping across multiple slots.

3. The method of claim 1, wherein the beam sweeping across multiple slots comprises:
   transmitting multiple PUCCHs with a same beam within a slot; and
   using different beams for PUCCH transmissions in different slots.

4. The method of claim 1, further comprising receiving a PUCCH configuration indicating a format for the PUCCH.

5. The method of claim 4, wherein the PUCCH configuration indicates at least one of:
   a number of beams for the beam sweeping;
   a number of slots per beam; or
   a beam order for the beam sweeping.

6. The method of claim 1, wherein the one or more actions further comprise performing the autonomous HO when a mobility trigger condition is met.

7. The method of claim 1, wherein at least one of the one or more conditions involves a mobility trigger condition indicating a neighbor cell is better than a current serving cell.

8. The method of claim 7, wherein the UE is configured to transmit PUCCH with beam sweeping across multiple slots where the mobility trigger condition is not met.

9. The method of claim 7, wherein the UE is configured to perform the autonomous HO where the mobility trigger condition is met for a calculated time.

10. The method of claim 9, wherein the UE is configured to transmit PUCCH with beam sweeping across multiple slots where the mobility trigger condition has not yet been met for the calculated time.

11. The method of claim 9, wherein the calculated time is less than a configured time to trigger timer (TTT) value.

12. The method of claim 9, wherein the calculated time is based on a percentage of ratio of an elapsed time since the mobility trigger condition was met and a configured TTT value.

13. The method of claim 1, further comprising receiving a configuration indicating at least one of:
   whether the UE is configured to perform the autonomous HO or transmit a PUCCH with beam sweeping across multiple slots, depending on one or more conditions, upon determining a failure to receive and decode at least one scheduled DL transmission from a network entity is based, at least in part, on the UE being out of coverage;
   a number of slots for transmitting a PUCCH with beam sweeping; or
   a parameter for calculating a calculated time based on a configured TTT value.

14. The method of claim 13, wherein a value of the parameter depends, at least in part, on a traffic service type.

15. A method for wireless communications by a network entity, comprising:
   configuring a user equipment (UE) to take one or more actions based upon determining a failure to receive and decode at least one scheduled downlink (DL) transmission from the network entity is based, at least in part, on the UE being out of coverage and on one or more conditions, wherein the one or more actions include:
      transmitting a physical uplink control channel (PUCCH) with beam sweeping across multiple slots when the UE is configured to transmit PUCCH with beam sweeping across multiple slots; and
      performing an autonomous handover (HO) when the UE is not configured to transmit PUCCH with beam sweeping across multiple slots; and monitoring for uplink (UL) transmissions from the UE in accordance with the configuration.

16. The method of claim 15, further comprising configuring the UE with a pattern for the beam sweeping across multiple slots.

17. The method of claim 15, wherein the beam sweeping across multiple slots comprises:
   transmitting multiple PUCCHs with a same beam within a slot; and
   using different beams for PUCCH transmissions in different slots.

18. The method of claim 15, wherein the configuring comprises transmitting the UE a PUCCH configuration indicating a format for the PUCCH.

19. The method of claim 18, wherein the PUCCH configuration indicates at least one of:
   a number of beams for the beam sweeping;
   a number of slots per beam; or
   a beam order for the beam sweeping.

20. The method of claim 15, wherein the one or more actions further comprise performing the autonomous HO when a mobility trigger condition is met.

21. The method of claim 15, wherein at least one of the one or more conditions involves a mobility trigger condition indicating a neighbor cell is better than a current serving cell.

22. The method of claim 21, wherein the UE is configured to transmit PUCCH with beam sweeping across multiple slots where the mobility trigger condition is not met.

23. The method of claim 21, wherein the UE is configured to perform the autonomous HO where the mobility trigger condition is met for a calculated time.

24. The method of claim 23, wherein the UE is configured to transmit PUCCH with beam sweeping across multiple slots where the mobility trigger condition has not yet been met for the calculated time.

25. The method of claim 23, wherein the calculated time is less than a configured time to trigger timer (TTT) value.

26. The method of claim 23, wherein the calculated time is based on a percentage of ratio of an elapsed time since the mobility trigger condition was met and a configured TTT value.

27. The method of claim 15, further comprising transmitting to the UE a configuration indicating at least one of:
   whether the UE is configured to perform the autonomous HO or transmit a PUCCH with beam sweeping across multiple slots, depending on one or more conditions, upon determining a failure to receive and decode at least one scheduled DL transmission from a network entity is based, at least in part, on the UE being out of coverage;
   a number of slots for transmitting a PUCCH with beam sweeping; or
   a parameter for calculating a calculated time based on a configured TTT value.

28. The method of claim 27, wherein a value of the parameter depends, at least in part, on a traffic service type.

29. An apparatus for wireless communications by a user equipment (UE), comprising:
   at least one processor; and
   a memory coupled to the at least one processor, the memory including instructions executable by the at least one processor to cause the apparatus to:
      determine a failure to receive and decode at least one scheduled downlink (DL) transmission from a network entity is based, at least in part, on the UE being out of coverage; and
      take one or more actions based, at least in part, on determining the failure is based, at least in part, on the UE being out of coverage and one or more conditions, wherein the one or more actions include:
         transmitting a physical uplink control channel (PUCCH) with beam sweeping across multiple slots when the UE is configured to transmit PUCCH with beam sweeping across multiple slots; and
         performing an autonomous handover (HO) when the UE is not configured to transmit PUCCH with beam sweeping across multiple slots.

30. An apparatus for wireless communications by a network entity, comprising:
   at least one processor; and
   a memory coupled to the at least one processor, the memory including instructions executable by the at least one processor to cause the apparatus to:
      configure a user equipment (UE) to take one or more actions based upon determining a failure to receive and decode at least one scheduled downlink (DL) transmission from the network entity is based, at least in part, on the UE being out of coverage and on one or more conditions, wherein the one or more actions include:
         transmitting a physical uplink control channel (PUCCH) with beam sweeping across multiple slots when the UE is configured to transmit PUCCH with beam sweeping across multiple slots; and
         performing an autonomous handover (HO) when the UE is not configured to transmit PUCCH with beam sweeping across multiple slots; and
      monitor for uplink (UL) transmissions from the UE in accordance with the configuration.

* * * * *